(No Model.)

T. ROWLEY.
MEANS FOR DETECTING PUNCTURES, LEAKAGE, OR POROUSNESS IN PNEUMATIC TIRES.

No. 598,577. Patented Feb. 8, 1898.

Witnesses.

Inventor
Thomas Rowley
by W. N. Fincher
Att'y.

UNITED STATES PATENT OFFICE.

THOMAS ROWLEY, OF MANCHESTER, ENGLAND.

MEANS FOR DETECTING PUNCTURES, LEAKAGE, OR POROUSNESS IN PNEUMATIC TIRES.

SPECIFICATION forming part of Letters Patent No. 598,577, dated February 8, 1898.

Application filed January 9, 1897. Serial No. 618,631. (No specimens.)

*To all whom it may concern:*

Be it known that I, THOMAS ROWLEY, a subject of the Queen of Great Britain, residing at Manchester, in the county of Lancaster, England, have invented a certain new and useful Improvement Relating to Pneumatic Tires for Detecting Punctures, Leakage, or Porousness Therein, of which the following is a full, clear, and exact description.

This invention relates to means for readily discovering the locality of a puncture, leakage, or porousness in the air-tube of a pneumatic tire.

The object of this invention is to enable a cyclist or other person to localize any small puncture or to determine if the air-tube is porous, which is not detected without considerable trouble and expenditure of time by the methods ordinarily adopted.

In this invention I employ an anilin or other suitable coloring-matter or other detective substance which I apply to the interior surface of the air-tube, either in a powdered form or as a liquefaction at any convenient period, either during the process of manufacture or after vulcanization. I employ, by preference, any anilin or substance that is of a bright color, such as scarlet, and which is soluble either in water or in spirit, or any fluid or substance that will give ready indication of its presence through any puncture or other defect in the air-tube.

Figure 1:
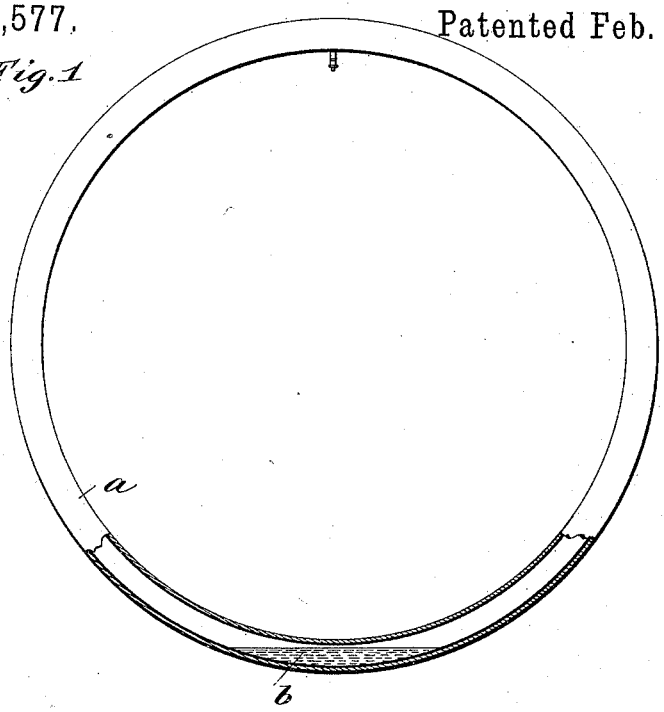
Figure 2:
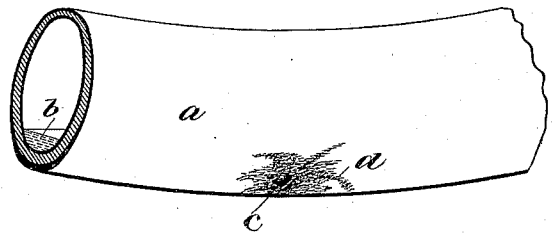
Figure 3:

In the accompanying drawings, illustrating my invention, in the several figures of which like parts are similarly designated, Figure 1 is an elevation in conventional form of a pneumatic tire broken out to show the inclosed detective substance. Fig. 2 is a portion of a pneumatic tire showing a discolored puncture. Fig. 3 is a portion of a pneumatic tire showing discolored porousness.

The tire *a* may be of any approved construction, and within it or within the air-tube thereof is placed the detective substance *b*. Upon occurrence of a puncture, as *c*, the surrounding surface will be discolored, as at *d*, by the escape of the detective substance. If it be used in fluid form or if in other form, such discoloration will be developed by application of moisture.

In Fig. 3 the discoloration at *e* indicates porousness or inherent defect in the tire, such discoloration being made evident in the manner described with respect to the puncture.

In applying my invention the aforesaid coloring-matter or substance is placed within the air-tube in either of the forms hereinbefore named that may be preferred. If an anilin or other coloring-matter in a powdered state is employed, a sufficiency of the said powder is inserted into the air-tube to dust over the interior surface of said tube, and in order to detect the locality of a puncture, leakage, or porousness the exterior surface of the air-tube is moistened with either water or spirit, according to the nature of the anilin or other substance employed, when the perforation or other defect will be indicated by the discoloration of the air-tube at the point of puncture, or if the tube is porous by the general discoloration of the exterior surface. If the anilin or other substance employed is a liquefaction in either a fluid or a semifluid state, I insert in like manner into the air-tube a sufficient quantity of said liquefaction that may be spread or that will spread itself over the interior surface of the air-tube, and will, when the air-tube is punctured or otherwise becomes defective, indicate the puncture or defect by discoloration that will appear on the exterior surface of said tube at the locality of the puncture or defect.

I do not confine myself to the precise nature of the anilin or other coloring-matter or substance to which I have hereinbefore referred. I may employ ordinary coloring-matter or other substance or liquefaction applied in the manner hereinbefore described that will exude from a puncture or other defect in the air-tube, and thereby indicate the locality of said defect; but,

Having now described my invention, what I claim as new, and desire to secure by Letters Patent, is—

1. As an improved article of manufacture, a pneumatic tire provided with a suitable soluble coloring-matter or detective substance, such as anilin, applied to the inner surface of the tube and adapted to escape through any puncture or other defect in said tube, and discolor the exterior surface of the tube for the purpose and in the manner substantially as hereinbefore described.

2. In a pneumatic tire, an anilin or other suitable coloring-matter or detective substance applied to the inner surface of the air-tube as a liquefaction either in a fluid or in a semifluid state, in such quantity, that it may be spread or will spread itself over the interior surface of said tube and will when the air-tube is punctured or otherwise becomes defective, exude from said puncture or defect and indicate the locality of the puncture or defect, substantially as hereinbefore described.

3. In a pneumatic tire, an anilin or other suitable coloring-matter or detective substance applied to the interior surface of the air-tube, and adapted to escape through any puncture or defect in the tire and discolor its exterior surface in the presence of moisture, substantially as and for the purpose hereinbefore described.

In testimony whereof I have hereunto set my hand this 14th day of December, A. D. 1896.

THOMAS ROWLEY.

Witnesses:
  WM. SYKES,
  THOS. PRESCOTT.